(12) United States Patent
Huber et al.

(10) Patent No.: US 7,025,808 B2
(45) Date of Patent: Apr. 11, 2006

(54) REDUCTION OF THE AEROSOL-RELATED DISCHARGE FROM A SEPARATION COLUMN AND APPARATUS THEREFOR

(75) Inventors: Günther Huber, Limburgerhof (DE); Karl Hölemann, Mannheim (DE); Jan-Martin Löning, Freinsheim (DE); Bernd Sachweh, Meckenheim (DE)

(73) Assignee: BASF Aktiengesellschaft, Ludwigshafen (DE)

(*) Notice: Subject to any disclaimer, the term of this patent is extended or adjusted under 35 U.S.C. 154(b) by 74 days.

(21) Appl. No.: 10/775,097

(22) Filed: Feb. 11, 2004

(65) Prior Publication Data

US 2004/0182241 A1 Sep. 23, 2004

(30) Foreign Application Priority Data

Feb. 11, 2003 (DE) ............................... 103 05 578

(51) Int. Cl.
*B01D 47/14* (2006.01)

(52) U.S. Cl. ............................ 95/211; 96/272; 96/290; 96/300

(58) Field of Classification Search ................... 95/210, 95/211, 213; 96/272, 290, 296, 300; 422/211
See application file for complete search history.

(56) References Cited

U.S. PATENT DOCUMENTS 4,348,373 A * 9/1982 Schoubye .................. 423/522
5,660,615 A * 8/1997 Neumann et al. ............. 95/187
6,312,503 B1 * 11/2001 Fike et al. ..................... 95/211
2002/0157537 A1 * 10/2002 Hayashida et al. ........... 95/211

FOREIGN PATENT DOCUMENTS

JP 2002-126439 A * 5/2002

OTHER PUBLICATIONS

Chem. Eng. Sci., 1995 (50), 8, 1347 to 1360.
Chem.-Ing.-Tech. 1976 (48), 9, 795 ff.
Chemie Anlagen Verfahren 1988, Aug., S. 12-13.

* cited by examiner

*Primary Examiner*—Frank M. Lawrence
(74) *Attorney, Agent, or Firm*—Novak Druce & Quigg, LLP; Jason D. Voight

(57) ABSTRACT

A process is proposed for reducing the aerosol-related discharge from a separation column (1) in which one or more components are separated off from a gaseous or liquid starting mixture (G) at actively separating internals (2), aerosols being present or formed in a gas phase, which comprises the actively separating internals (2) being segmented at one or more separation points, which are determined in such a manner that the aerosols have at least 50% of their maximum particle size at the separation point or separation points, and an internal (3) being provided at each separation point, which internal is operated under at least partially flooded conditions, a continuous liquid phase being formed at least in partial regions of the internal (3), to which region the aerosols are bound.

29 Claims, 3 Drawing Sheets

REDUCTION OF THE AEROSOL-RELATED DISCHARGE FROM A SEPARATION COLUMN AND APPARATUS THEREFOR

The invention relates to a process for reducing the aerosol-related discharge from a separation column, an apparatus, and a use.

FIELD OF THE INVENTION

Aerosols are thermodynamically stable suspensions of solid or liquid particles in gases, a value of about 10 µm generally being reported as upper limit value for the particle diameter.

The mechanisms of aerosol formation have been extensively described in the literature, for example in K. Schaber: Chem. Eng. Sci., 1995 (50), 8,1347 to 1360. These include, in particular, formation by gas-phase reactions, by desublimation or by falling below the dew point limit and subsequent condensation on homogeneous or heterogeneous nuclei. Whereas reaction aerosols can be suppressed by specific influences on gas composition, the formation of condensation aerosols in apparatuses operated in a moist state, for example in gas scrubbers, is frequently inevitable. This formation can generally only be influenced by apparatus-related measures, since, in industrial processes, local gas-phase supersaturations arid the introduction of condensation nuclei cannot usually be avoided.

Relatively large droplets, from about 10 µm, can be separated off in conventional random packing beds. However, shifting the separation curves towards the fine droplet region is possible only via increasing inlet velocity or an a marked increase in length of the random packing bed and thus increasing pressure drop. Because of the high pressure drop and high cost of equipment at high velocities, it therefore appears, according to A. Bürkholz: Chem.-Ing.-Tech. 1976 (48), 9,795, inexpedient to use customary packed beds for separating off fine mist below approximately 2 µm.

The same also applies to wire mesh demisters and to other conventional demisters, such as cyclones or baffle separators, which are all based on the principle of inertial separation. Only in Venturi scrubbers or diffusion separators are the separation limits needed for aerosol separation achieved, but at the price of increased capital and running costs.

It is possible to avoid the formation of condensation aerosols in separation columns by suitable process conditions, more precisely, in particular, by increasing the operating temperature. By means of higher temperatures, the degree of saturation of the gas phase can be reduced and the temperature-composition path of the separation operation can be preventing from falling below the dew point line. Operating at elevated temperatures does not achieve the goal in every case, since supersaturations cannot be avoided at all points by this means, the gas solubility of the components to be separated off is generally impaired with increasing temperature, and increased material stresses occur (for example when plastics are used in the absorption of hydrogen chloride).

H. C. Reijnen: Abscheidung von Feinstaerosolen [Separation of Very Fine Aerosols] in Chemie Anlagen Verfahren 1988, August, pages 12 and 13, discloses a multistage process system for flue gas desulfurization of coal-fired power stations and refuse incineration plants, having preseparation of aerosols greater than 3 µm in a first stage, injection of water/steam or air in a second stage for aerosol growth from a particle size of 0.1 µm to 0.8 to 1.0 µm, a third coalescence stage, aerosol agglomeration from a particle size from 0.8 to 1 µm to 10 to 12 µm being achieved under flooding conditions, and final separation of droplets in a fourth stage, droplets greater than 10 to 12 µm being separated off. The process describes solely the separation of reaction aerosols.

In the course of increasing the severity of air pollution prevention regulations, apparatuses and plants needing new approval have to satisfy increased requirements with regard to pollution emission. For instance, for example, the current German technical regulations on clean air (TA-Luft) decrease the permissible dust value from 50 $mg/m^3$ to 20 $mg/m^3$. In addition, in the case of preexisting plants, emission limitations by retrofitting may be required.

DETAILED DESCRIPTION OF THE INVENTION

It is an object of the present invention to provide a process which makes it possible to retrofit existing separation columns in an economic manner such that they meet the new clean air requirements. In particular, an aerosol-related discharge from separation columns is to be decreased or avoided, or materials of value are to be recovered by separating aerosols in an economic manner, with utilization of effective separation mechanisms (inertia and diffusion).

It is also an object of the present invention to provide a separation column in which aerosols can be separated in a cost-effective manner, with utilization of effective separation mechanisms (inertia and diffusion) and which, furthermore, can be operated at a presettable pressure drop which can be set independently of the gas stream through the apparatus of the gas mixture to be separated.

We have found that this object is achieved by a process for reducing the aerosol-related discharge from a separation column in which one or more components are separated off from a gaseous or liquid starting mixture on actively separating internals, aerosols being present or being formed in a gas phase in the separation column, the actively separating internals being segmented at one or more separation points and the separation point(s) being determined in such a manner that the aerosols have at least 50% of their maximum particle size at the separation point or separation points and an internal being provided at each separation point, which internal is operated under at least partially flooded conditions, a continuous liquid phase being formed at least in partial regions of the internal, to which regions the aerosols are bound.

The present invention thus provides a solution of simple construction which provides an economic way for arranging apparatuses to be newly erected, and for retrofitting existing apparatuses, according to which aerosols can be separated off in a cost-effective manner, with utilization of effective separation mechanisms (inertia and diffusion).

For the purposes of the present invention, separation column predominantly means all apparatus which are used in process engineering for carrying out thermal separation processes. These include, in particular, distillation columns, reactive distillation columns, reaction columns, reactive extraction columns, absorption columns (gas scrubbers), desorption columns (stripping columns), adsorption columns or apparatus for carrying out membrane separation processes.

The process of the invention relates in particular to improving absorption columns, also called gas scrubbers. Gas scrubbers are widely used in process engineering. These are generally tubular apparatuses having internal diameters in the range from 100 to 8,000 mm which are used for separating off one or more components from a gas mixture by absorption into a scrubbing liquid. These can be unwanted components ("foreign" substances in air), in clean-air processes, or, in contrast, materials of value. To improve mass transfer and heat exchange, gas scrubbers are fitted with actively separating internals, for example random packings, ordered packings or trays.

In separation columns, in particular in gas scrubbers, aerosols can form by all known formation mechanisms, in particular reaction aerosols and/or condensation aerosols and/or sublimation aerosols. Aerosols may be only transitory, that is to say present only in partial regions of the gas scrubber.

According to the invention, the actively separating internals of the separation column present, in particular of the gas scrubber, are segmented at one or more separation points, the separation point(s) being determined in such a manner that the aerosols have at least 50% of their maximum particle size at the separation point or separation points.

The term particle size is defined as the mass mean diameter of a particle distribution, according for example to Löffler, "Staubabscheiden", Thieme-Verlag Stuttgart, 1988, S. 9, Gleichung (1.20). The mass mean diameter is the cubic root of the third moment $M_{3,0}$ of the particle distribution. Particle distributions are measured with the aid of standard equipment.

It is known to those skilled in the art how to calculate the aerosol particle sizes in separation columns: a temperature and concentration profile can be calculated for a separation column operated in countercurrent and cocurrent flow by means of a segmented calculation of the coupled mass transfer and heat exchange. For a column operated in counterflow, for example, the commercially available mass and heat transfer simulator "ASPEN RATEFRAC®" (manufacturer: ASPEN Technology, Cambridge, Mass., U.S.A.) can be used. For this purpose the column is subdivided by calculation into individual axial segments and in each segment i the partial pressures $p_1$ of the gaseous components are calculated.

In the individual segments the gas and liquid phases, however, are not in equilibrium. Therefore, the partial pressures of the condensable components for the gas phase which is not in equilibrium $\Sigma P_j^{\infty}$ serve, where j is a control variable for the number of the various vapor-phase components.

In the context of the inventive process, for the gas phase an isothermal equilibrium stage is then calculated for the condensation process. From this calculation, the partial pressures of the condensable components in isothermal equilibrium are obtained, $\Sigma P_{j,Glw}^{\infty}$.

From the results of the isothermal condensation of the gas phase, the degree of saturation $S_i$ for each individual column segment may be calculated from equation (1)

$$S_i = \frac{\sum P_j^{\infty}}{\sum P_{j,Glw}^{\infty}} \tag{1}$$

Using the degrees of saturation $S_1$ thus calculated, in a first step, it is then possible to estimate whether a particle of defined size and defined wetting properties can grow via condensation.

An estimate of this type can be made from the known equations for describing the relationship between the degree of saturation S* and the particle radius $R^*_P$ in the equilibrium state (symbol*=equilibrium state). For a completely wettable particle, this relationship can be described, for example, using the Kelvin equation $$\ln S^* = \frac{2\sigma_{gl} V_1'}{kTR_p^*}. \tag{2}$$

Here, $\sigma_{gl}$ describes the surface tension of the liquid versus the gas, $v'_1$ the molecular volume, k the Boltzmann constant and T the temperature.

For completely wettable particles which in addition contain dissolved components (for example salts), and also for poorly wettable particles, corresponding relationships are available. In this context, reference is made to the post-doctoral thesis "Messen, Konditionieren und Abscheiden feinster Aerosolpartikel [Measurement, Conditioning and Separation of Very Fine Aerosol Particles, by Dr.-Ing. habil. Bernd A. Sachweh, Department of Mechanical Engineering and Process Engineering of the University of Kaiserslautern, 1996 (equations 2–14a and 2–18 there), which is hereby incorporated in full by reference in the contents of the present application.

If the actual degree of saturation S is greater than the corresponding equilibrium value S*, in principle condensation on the particles acting as nuclei can occur. This process is termed particle activation. If, in contrast, the actual degree of saturation is less than the corresponding equilibrium value S*, the particles can shrink in size by evaporation. The equilibrium value S* is therefore termed the critical degree of saturation, and the associated particle radius the critical particle radius $R^*_p$.

Calculating the critical degree of saturation S* as a function of particle radius in accordance with equation (2) or in accordance with the corresponding equations for particles having dissolved components, or for poorly wettable particles, leads to what are termed Köhler curves, which ultimately permit an estimation to be made as to whether particles of defined size and defined wetting properties can grow by condensation. As shown in the post-doctoral thesis cited, it is found that to activate particles smaller than 50 nm, independently of their wetting properties, a critical supersaturation is required which increases exponentially with increasing particle size. If a—condensation is sought, the degree of saturation should therefore be set so that particles larger than 50 nm can contribute to nucleus formation. Smaller particles are not to be taken into account for nucleus formation, since these at the same time contribute only in a negligible amount to the particle mass discharge from a column.

In a second calculation step, furthermore, the time course of particle growth due to condensation is to be described. By this means it is ultimately possible to determine to what size the particles can grow as a function of their residence time in the apparatus.

For this, in a further calculation program, the information on the segment-dependent degrees of saturation $S_i$ is used using one or more further equations to describe the particle growth over time t. This can be carried out, for example, using equation (3).

$$\frac{dR_p}{dt} = \frac{S-1}{p_1 R_p}\left[\frac{L^2}{\lambda_L R_v T_\infty^2} + \frac{p - Sp_{vs}(T_\infty)}{pD_{vg}P_{vs}(T_\infty)}\right]^{-1}, \tag{3}$$

where S is the degree of saturation $p_1$ the density of the particles (liquid), L the latent heat of condensation $\lambda_L$ the thermal conductivity of the surrounding medium, $R_v$ the gas constant of the vapor, p the total pressure of the gas phase in the separation column, $D_{vg}$ the diffusion constant of the vapor in the surrounding medium, $p_{vs}$ the partial pressure of the vapor in the saturation state and $T_\infty$ the temperature of the surrounding medium at infinite distance from the particle surface. Corresponding equations which permit account to be taken of the curved surface of the particles and also of dissolved non-vaporizing components (salts for example) on the condensation process are described in the above-cited post-doctoral thesis "Messen, Konditionieren und Abscheiden feinster Aerosolpartikel" [Measurement, Conditioning and Separation of Very Fine Aerosol Particles] by Dr.-Ing. habil. Bernd A. Sachweh, Department of Mechanical Engineering and Process Engineering of the University of Kaiserslautern, 1996 (equations 2–37 and 2–38 there).

Using this procedure it is then possible to calculate the particle size course over the column height in segments and thus to determine the optimum position for the intermediate separation of the aerosols.

According to the invention, at the separation point or separation points which have been calculated as described above, an internal or internals are provided which are operated in an at least partially flooded operating state. The term partially flooded means that in partial regions of the internal, which need not be coherent, a continuous liquid phase is imposed.

It is disclosed, for example, by DE-A 199 36 380, to operate column internals specifically in a flooded state to improve mass and heat transport processes. Critical factors for this are the geometry of the internals and the liquid and gas rates set through the internals. The mechanism of flooding may be illustrated phenomenologically by two processes: firstly, the liquid film flowing off on the internals is backed up and, secondly, liquid droplets carried along upward by the gas stream are backed up.

Preferably the separation point(s) is (are) determined in such a manner that the aerosols there have at least 80% of their maximum particle size. Particularly preferably, the separation point(s) is (are) determined in such a manner that the aerosols there have at least 90% of their maximum particle size.

In a preferred process variant, the actively separating internals are segmented at a single separation point.

The internal or the internals at the separation point or separation points can fill up the entire internal diameter of the separation column, but it is alternatively possible to construct the internal (the internals) in such a manner that it (they) only partially fills (fill) the internal diameter of the separation column. This can be advantageous, in particular, to achieve an at least partially flooded operating state of the internal more simply owing to the higher gas velocity through the internal.

With respect to the specific construction of the internal, there are in principle no limitations. Possible internals are, for example, random packing beds, the random packings in principle being able to assume any geometry, ordered packings, trays which are operated with a trickling layer and also meshes, knitted fabrics or nonwovens made of metals, plastics or glass.

Preference is given to internals having specific surface areas in the range from 60 to 2,500 $m^2/m^3$ and porosities in the range from 85 to 98%, preferably from 91 to 96%.

It is advantageous to introduce an external gas, vapor and/or liquid stream into the separation column upstream of the internal (the internals), in order to saturate or supersaturate the gas stream to be purified.

In an advantageous embodiment, a defined pressure drop, independent of the gas stream, can be generated over the internal via an external liquid feed and/or outlet. An advantageous pressure drop over the internal is one in the range from 0 to 200 mbar, preferably in the range from 5 to 40 mbar.

The at least partial flooding of the internal can be produced via the liquid passed into the separation column for absorption, via liquid droplets, which are carried along by the gas stream into the internal. An external liquid feed to the internal is also possible, the liquid fed externally having the same composition as the scrubbing liquid, or can be different therefrom.

Preference is given to heights of the internals in the range from 100 to 500 mm.

The process is not restricted with respect to the current direction of the gas mixture and scrubbing fluid to be purified; cocurrent and countercurrent flow conditions are equally possible.

The process is not restricted with respect to operating pressure and temperature. Operation is also possible at atmospheric pressure, at reduced pressure or superatmospheric pressure, with or without supply and removal of external heat.

The invention also relates to a separation column in which in the one or more components are separated off from a gaseous starting mixture at actively separating extensions, aerosols being present or formed in a gas phase, which is segmented at one or more separation points which are determined as defined herein, and which is fitted at every separation point with an internal, which is operated as defined herein and in which a defined pressure drop is generated via an external liquid feed and/or removal at the one or more internals operated under at least partially flooded conditions.

Preferably, the pressure drop at the internal operated under at least partially flooded conditions (at the internals operated under at least partially flooded conditions) is set in the range from 0 to 200 mbar, in particular in the range from 5 to 40 mbar.

The separation column is advantageously segmented at a single separation point.

Advantageously, the internal operated under at least partially flooded conditions (the internals operated under at least partially flooded conditions) is constructed in such a manner that the internal diameter of the separation column is only partially made up.

The internal operated under at least partially flooded conditions is preferably a random packing bed, an ordered packing a tray operated with trickling layer having a continuous liquid phase and disperse gas phase, or a mesh, knitted fabric or nonwoven made of metal, plastic or glass.

It is preferred here to use internals operated under partially flooded conditions having specific surface areas in the range from 60 to 2,500 $m^2/m^3$ and porosities in the range from 85 to 98%, preferably in the range from 91 to 96%.

Preferably, the separation column is gas scrubber, to which is fed a gaseous starting mixture and a wash liquid, preferably in countercurrent.

The inventive process and the inventive separation column are particularly suitable for purifying gas mixtures which have a tendency to form condensation aerosols, in particular gas streams which contain gaseous hydrogen halides, in particular hydrogen chloride and/or hydrogen bromide, gaseous sulfur trioxide, gaseous sulfuric acid or gaseous nitrogen dioxide.

The inventive process and the inventive separation column are equally suitable for purifying gas mixtures which have a tendency to form reaction aerosols, in particular gas mixtures containing gaseous ammonia and gaseous hydrogen chloride. Reaction mixtures from combustion processes are also mentioned here by way of example.

A further advantageous use relates to the purification of gas mixtures which have a tendency to form sublimation aerosols.

The solution found has not only technical but also economic advantages compared with known processes for avoiding aerosol-related discharge from separation columns.

It can be introduced as a simple retrofitting measure in preexisting separation columns, in particular gas scrubbers, without additional operating media or a change in operating parameters to maintain the emission limits being necessary therefor.

Compared with Venturi scrubbers or deep-bed diffusion filters, the solution found has better operating and/or capital costs.

Furthermore, the inventive process has an increased flexibility, since the inlet velocity of the gas phase can be varied over a wide operating range without marked effect on the separation performance, by externally controlling, for example via a differential pressure measurement, the liquid feed to the internal operated under at least partially flooded conditions.

A further advantage of the inventive process is that the operating temperature is low, which considerably improves the process of absorption of numerous gas components into an aqueous scrubbing solution.

The low operating temperatures are advantageous, in particular when corrosive material systems are used, for example hydrogen-halide-containing mixtures, since the material stress is thus lower. Furthermore, by means of a circulation procedure in processes for absorbing gas mixtures containing hydrogen halides, in particular hydrogen chloride, it is possible to produce highly concentrated hydrohalic acid solutions, in particular highly concentrated hydrochloric acid solutions.

The invention is described in more detail hereinafter with reference to a figure and use examples.

BRIEF DESCRIPTION OF THE DRAWINGS

In the figures, in detail.

In the figures, identical reference numbers denote the same or corresponding features.

Figure 1:
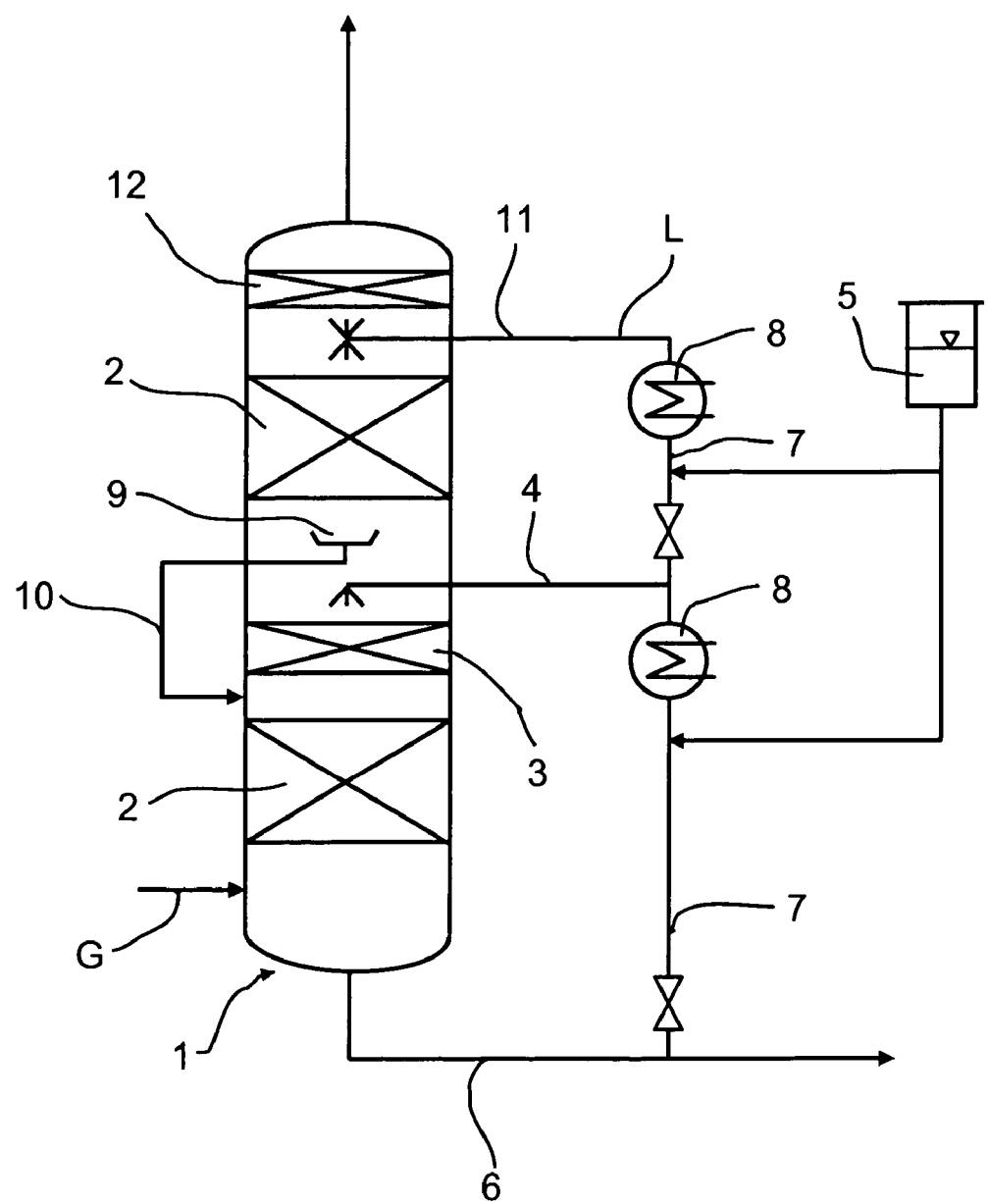
FIG. 1 shows a first preferred embodiment of a gas scrubber for carrying out the inventive process.

The diagrammatic representation in FIG. 1 shows a gas scrubber 1 to which is fed, in the lower region of same, the gaseous starting mixture G and, in countercurrent thereto, the scrubbing liquid L and are brought into contact with one another on conventional actively separating internals 2. Depending on the temperature, pressure and composition profile in gas scrubber 1, in the lower region of same fitted with actively separating internals 2, aerosol formation due to gas-phase reaction and/or condensation and/or desublimation can take place. The aerosol-laden gas stream from this region of the gas scrubber then flows through an internal 3 which is operated under partially or completely flooded conditions. This is possible, for example, by feeding to the internal 3 scrubbing liquid from the region of the gas scrubber 1 situated above it, or via an external feed line 4. The externally fed liquid can be fed to a vessel for scrubbing liquid 5 or to the bottom outlet 6 of the gas scrubber 1 via a recirculation line 7 and a heat exchanger 8.

It is also possible to collect effluent scrubbing liquid in the gas scrubber 1 above the internal 3 in a liquid collector 9 and to pass it into the lower section of the gas scrubber via an internal or external liquid line 10 bypassing the internal 3. In this embodiment, the internal 3 is moistened by liquid in the form of droplets or condensate which is carried along by the ascending gas stream.

The aerosol-laden gas stream, after flowing through the internal 3, is passed to a second section of the gas scrubber 1 which is fitted with conventional actively separating internals 2 which can be operated not only in the dry state, but also charged with scrubbing liquid, via an external feed line 11, for further depletion by absorption. The scrubbing liquid can likewise be fed to the vessel 5 or the bottom outlet 6 of the gas scrubber via a recirculation line 7 and a heat exchanger 8. At the column head, a demister 12 is advantageously provided in order to avoid entrainment of coarse droplets (particle diameter >>10 μm) in the purified gas stream which is withdrawn at the column head. The loaded scrubbing liquid is withdrawn via the bottom outlet of gas scrubber 1.

Figure 2:
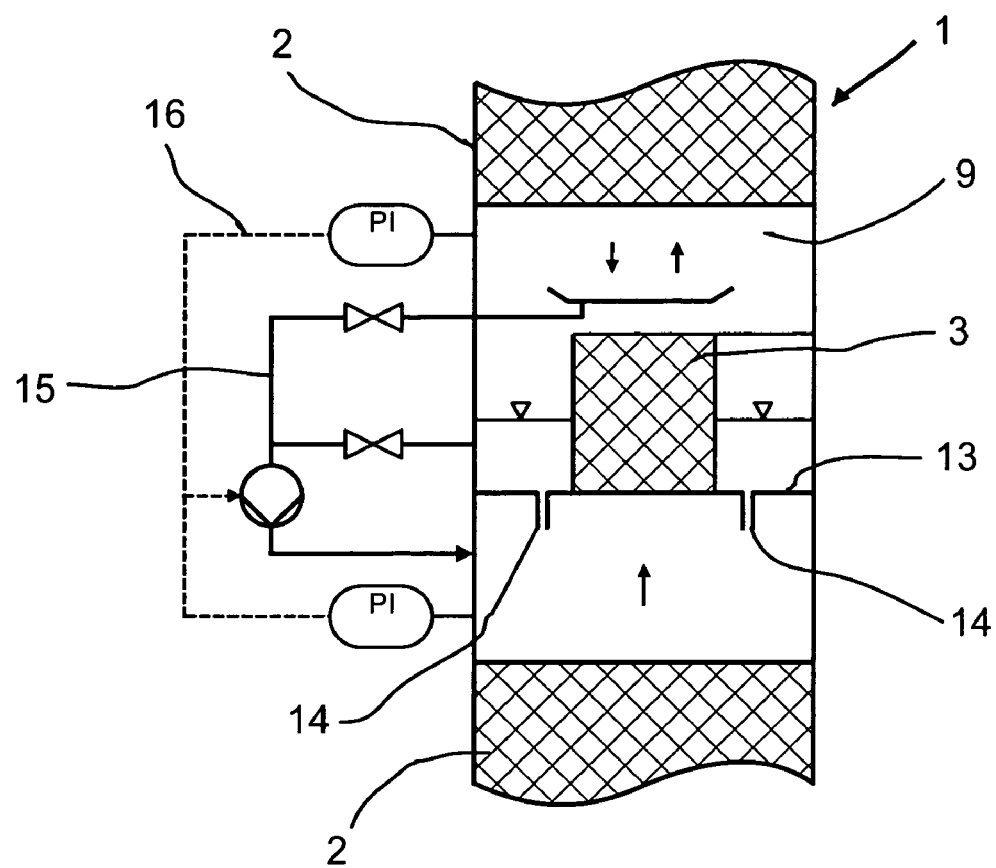
FIG. 2 shows a detail of a further preferred embodiment of a gas scrubber for carrying out the inventive process and FIG. 3 shows a graph of the experimental results for determining the purification efficiency of a gas scrubber of the prior art compared with gas scrubbers of the inventive process.

FIG. 2 shows a detail of a further preferred embodiment of a gas scrubber 1 for carrying out the inventive process, in which the internal 3 which is operated under partially or completely flooded conditions and is disposed between two regions having conventional actively separating internals 2 and which has a smaller diameter compared with the internal diameter of the gas scrubber 1. The internal 3 is disposed in the gas chimney of a tunnel tray 13 on which, in the particular embodiment shown in FIG. 2 liquid is backed up to a certain height based on the internal 3. The scrubbing liquid is passed via outlets 14 from the tunnel tray 13 to the lower region of the gas scrubber 1. Alternatively to this, scrubbing liquid can also he removed via an external line 15 having shut-off and transport devices to the lower region of the gas scrubber 1. The liquid stream withdrawn can he controlled via differential pressure measurement 16, as a result of which a defined pressure drop can be set on the internal 3.

USE EXAMPLES

In an experimental apparatus which has been constructed in accordance with the diagrammatic representation in FIG. 2, the efficiency of the inventive process was studied in the system water, hydrogen chloride, nitrogen. The experimental apparatus consisted of a gas scrubber having internal diameter of 100 mm having two random packing beds each of 500 mm in length made of conventional plastic random packings, namely Hiflow® rings from Rauschert of a specific surface area of 313 $m^2/m^3$ and a porosity (degree of intergranular space) of 91%. Between the two random packing beds was inserted an internal formed from a wire mesh demister made of plastic, having a length of 150 mm and a diameter of 50 mm. Two wire mesh demisters were studied which differed in their specific surface area and porosity, that is to say a first wire mesh demister having a small specific surface area of 555 $m^2/m^3$ and a porosity of 95.5%, and a second wire mesh demister having a high specific surface area of 615 $m^2m^3$ and a porosity of 93.8%.

The first internal was operated under partially flooded conditions, and the pressure drop over the internal was 10 mbar. The second internal was operated under completely flooded conditions, and the pressure drop was 20 mbar.

The experimental apparatus was operated at ambient pressure under isothermal conditions.

The scrubbing liquid used was a 1% strength by weight aqueous hydrochloric acid solution which was heated to a temperature of 22° C. The liquid loading of the column was 18 m³/m²/h.

The dry gas stream to be purified of 14.6 m3 (S.T.P.)/h of nitrogen was fed to the scrubbing column at a constant hydrogen chloride concentration of 3,100 ppm by volume and an inlet temperature of 25° C.

Fine solid ammonium chloride particles at a concentration range from $10^5$ to $4.5 \times 10^7$ particles/cm³ were added to the gas stream to be purified as condensation nuclei for aerosol formation. The order of magnitude of the size of the nuclei can be estimated at from 0.05 to 1 µm (see K. Schaber: Chem. Eng. Sci., 1995 (50), 8, p. 1347, table 1).

Figure 3:
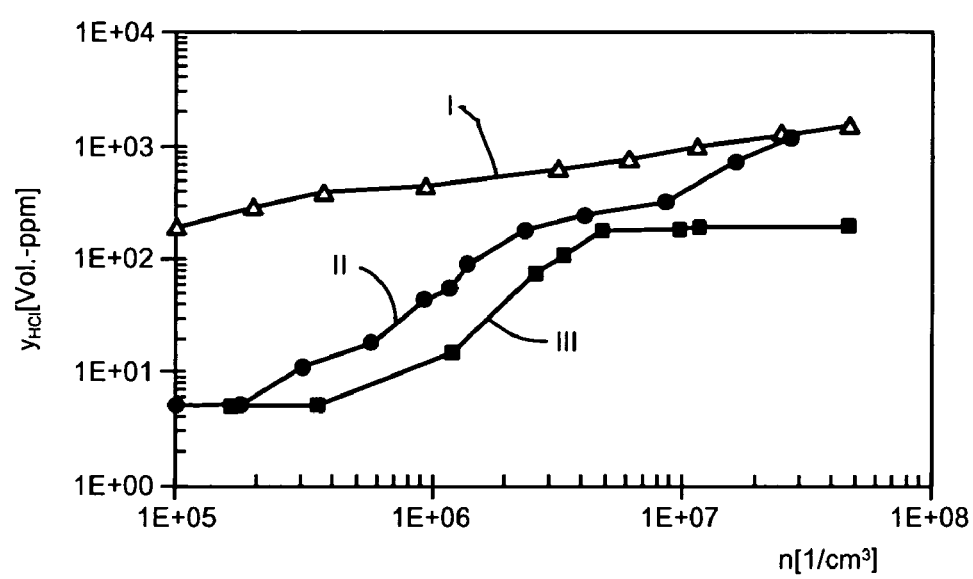

The double logarithm plot in FIG. 3 shows the remaining hydrogen chloride contents in the purified gas stream, $Y_{HCl}$, in ppm by volume as a function of the number of particles n in the gas stream to be purified, in 1/cm³, in each case for one gas scrubber of the prior art (curve I, marked with triangles) and for an inventive gas scrubber having an internal operated under partially flooded conditions (curve II, the measured points are shown as circles) and for an internal operated under flooded conditions (curve III, the measured points are shown as squares).

The experimental results show that due to the inventive use of an internal operated under at least partially flooded conditions in the entire particle concentration range the hydrogen chloride concentration is reduced in the purified gas stream. Operation with a completely flooded internal proved to be particularly effective, and led, in the industrially relevant number range of nuclei up to $10^6$ particles/cm³ led to a purified gas stream containing less than 30 ppm by volume of hydrogen chloride.

We claim:

1. A process for reducing the aerosol-related discharge from a separation column in which one or more components are separated off from a gaseous or liquid starting mixture at actively separating internals, aerosols being present or formed in a gas phase in the separation column, which comprises the actively separating internals being segmented at one or more separation points, the separation point(s) being determined in such a manner that the aerosols have at least 50% of their maximum particle size at the separation point or separation points, and an internal being provided at each separation point, which internal is operated under at least partially flooded conditions, at least in partial regions of the internal a continuous liquid phase being formed to which the aerosols are bound.

2. A process as claimed in claim 1, wherein the separation point(s) is (are provided at the point (points) at which the aerosols have at least 80% of their maximum particle size.

3. A process as claimed in claim 1, wherein the separation point(s) is (are) provided at the point (points) at which the aerosols have at least 90% of their maximum particle size.

4. A process as claimed in claim 1, wherein the actively separating internals are segmented at one separation point.

5. A process as claimed in claim 1, wherein the internal operated under at least partially flooded conditions (the internals operated under at least partially flooded conditions) only partially fills (fill) the internal diameter of the separation column.

6. A process as claimed in claim 1, wherein the internal operated under at least partially flooded conditions (the internals operated under at least partially flooded conditions) is (are) a random packing bed, an ordered packing, a tray operated with trickling layer having a continuous liquid and disperse gaseous phase, or a mesh, knitted fabric or nonwoven made of metal, plastic or glass.

7. A process as claimed in claims 1, wherein the specific surface area of the internal operated under at least partially flooded conditions (the internals operated under at least partially flooded conditions) is in the range from 60 to 2,500 m²/m³ and the porosity is in the range from 85 to 98%.

8. A process as claimed in claim 1, wherein an external gas, vapor and/or liquid stream is fed to the separation column downstream before the internal operated under at least partially flooded conditions (the internals operated under at least partially flooded conditions), based on the feed of the gaseous or liquid starting mixture, which external stream is controlled in such a manner that it causes the saturation or supersaturation of the gas phase in the separation column.

9. A process as claimed in claim 1, wherein a defined pressure drop is generated at the internal operated under at least partially flooded conditions (at the internals operated under at least partially flooded conditions), via an external liquid feed and/or removal.

10. A process as claimed in claim 9, wherein the pressure drop at the internal operated under at least partially flooded conditions (at the internals operated under at least partially flooded conditions) (3) is set at up to 200 mbar.

11. A process as claimed in claim 1, wherein the separation column is a gas scrubber to which are fed a gaseous starting mixture and a scrubbing liquid.

12. A separation column in which one or more components are separated off at actively separating internals from a gaseous or liquid starting mixture, aerosols being present or formed in a gas phase, wherein the separation column is segmented at one or more separation points which are determined as defined in claim 1, in such a manner tat the separation column is fitted at every separation point with an internal which is operated as defined in claim 1 and that a defined pressure drop is generated via an external liquid feed and/or removal at the internal operated under at least partially flooded conditions (at the internals operated under at least partially flooded conditions).

13. A separation column as claimed in claim 12, wherein the pressure drop at the internal operated under at least partially flooded conditions (at the internals operated under at least partially flooded conditions) is set at up to 200 mbar.

14. A separation column as claimed in claim 12, wherein the actively separating internals are segmented at one separation point.

15. A separation column as claimed in claim 12, wherein the internal operated under at least partially flooded conditions (the internals operated under at least partially flooded conditions) only partly makes up (make up) the internal diameter of the separation column.

16. A separation column as claimed in claim 12, wherein the internal operated under at least partially flooded conditions (the internals operated under at least partially flooded conditions) is (are) a random packing bed, an ordered packing, a tray operated with trickling layer having a continuous liquid and disperse gas phase, or a mesh, knitted fabric or nonwoven made of metal, plastic.

17. A separation column as claimed in claim 12, wherein the specific surface area of the internal operated under at least partially flooded conditions (the internals operated under at least partially flooded conditions) is in the range from 60 to 2,500 m²/m³ and the porosity is in the range from 85 to 98%.

18. An apparatus as claimed in claim 12, wherein the separation column is a gas scrubber to which are fed a gaseous starting mixture and a scrubbing liquid.

19. The process as claimed in claim 1 wherein the starting mixture is a gas stream which has a tendency to form condensation aerosols, and which comes into contact with aqueous solutions.

20. The process as claimed in claim 1 wherein the starting mixture is a gas stream which has a tendency to form reaction aerosols.

21. The process as claimed in claim 1 wherein the starting mixture is a gas stream which has a tendency to form sublimation aerosols.

22. A process as claimed in claim 7, wherein the porosity is in range from 91 to 96%.

23. A process as claimed in claim 10, wherein the pressure drop is set in the range from 5 to 40 mbar.

24. A process as claimed in claim 11, wherein the gaseous starting mixture and the scrubbing liquid of fed in countercurrent.

25. A separation column as claimed in claim 13, wherein the pressure drop is set in the range from 5 to 40 mbar.

26. A separation column as claimed in claim 17, wherein the porosity is in the range from 91 to 96%.

27. An apparatus as claimed in claim 18, wherein the gaseous starting mixture and the scrubbing liquid are fed in countercurrent.

28. A method as claimed in claim 19, wherein the gas stream contains hydrogen chloride and/or hydrogen bromide, gaseous sulfur trioxide, gaseous sulfuric acid or gaseous nitrogen dioxide, and which comes into contact with aqueous solutions which contain ions produced in the absorption of the abovementioned substances in water.

29. A method as claimed in claim 20, wherein the starting mixture is a gas stream which contains ammonia and hydrogen chloride.

* * * * *